United States Patent [19]

Planche

[11] 3,798,966

[45] Mar. 26, 1974

[54] WELL LOGGING SONDE HAVING ARTICULATED CENTERING AND MEASURING SHOES

[75] Inventor: Jean Planche, Val De Marne, France

[73] Assignee: Schlumberger Technology Corporation, New York, N.Y.

[22] Filed: Aug. 29, 1972

[21] Appl. No.: 284,686

Related U.S. Application Data

[63] Continuation of Ser. No. 52,869, July 7, 1970, abandoned.

[52] U.S. Cl. .................................................. 73/151
[51] Int. Cl. .......................................... E21b 49/00
[58] Field of Search........... 33/178 R, 174 R, 178 F; 73/151, 152; 166/241; 250/83.6 W; 324/10

[56] References Cited
UNITED STATES PATENTS 3,448,373   6/1969   Hahn.......................... 250/83.6 W X
2,899,633   8/1959   Smith et al...................... 166/241 X Primary Examiner—Jerry W. Myracle
Attorney, Agent, or Firm—David L. Moseley; William R. Sherman; Stewart F. Moore

[57] ABSTRACT

A well logging sonde including a body member having centering shoes mounted on arms and thrust outwardly into engagement with a well bore wall by springs, and a measuring shoe assembly pivotally connected to at least one of the centering shoes and adapted to slide in intimate contact with the well bore wall, said measuring shoe being urged outwardly independently of the centering shoes to enable a reduced measuring shoe pressure with respect to the pressure of the centering shoes against the well bore wall.

8 Claims, 6 Drawing Figures

Jean Planche
INVENTOR

BY *David L. Mosley*

ATTORNEY

Jean Planche
INVENTOR

BY David L. Moseley

ATTORNEY

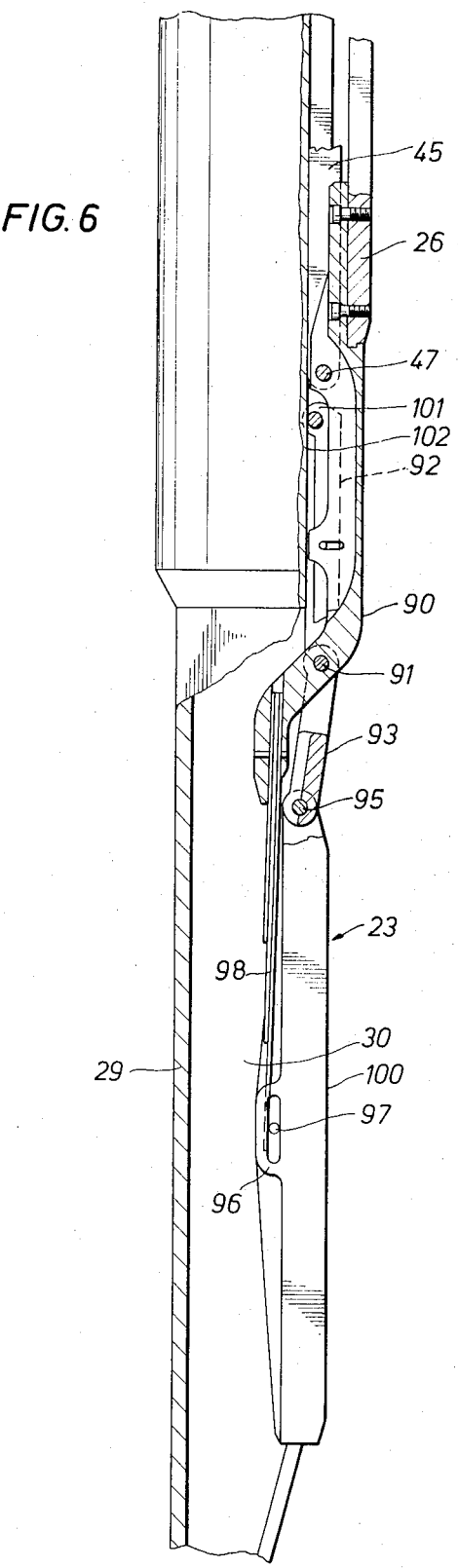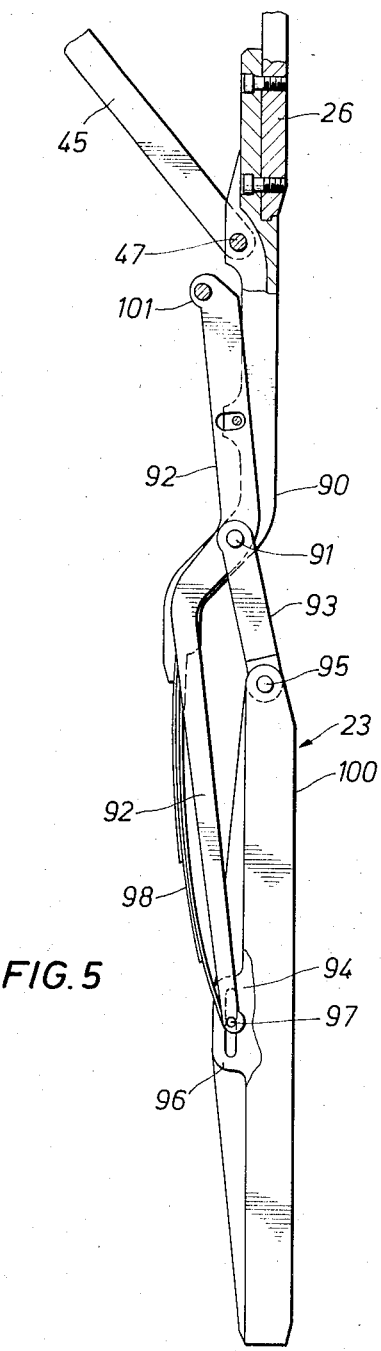

WELL LOGGING SONDE HAVING ARTICULATED CENTERING AND MEASURING SHOES

This application is a continuation of application Ser. No. 52,869 now abandoned, filed July 7, 1970.

This invention relates generally to measuring apparatus used in wells, and more particularly to well logging sondes having measuring shoes which contact the wall of the well bore.

Among the various measurement devices that are lowered into wells on electrical cable or wireline for logging geological formations, there are a number of sondes having one or more shoes which are thrust against the wall bore. The shoes, mounted on articulated arms, may be retracted into positions alongside the body of the sonde to facilitate lowering into the well. Such an apparatus is described in particular in U. S. Application Ser. No. 770,978 now abandoned, filed Oct. 28, 1968 and assigned to the assignee of the present invention.

The shoes may be equipped with electrodes, acoustical transducers, nuclear detectors or other devices according to the type of measurement to be carried out. The shoe is often made of a flexible material such as rubber or neoprene, so as to be able to conform to the curvature of the well bore wall. The thrust pressure against the well bore wall should be relatively small (often not in excess of 1 psi) so as not to tear or damage the contact surface of the shoe. In the case of deviated boreholes where the dip angle is great with respect to the vertical, the weight of the tool is not directed along the axis of the sonde and has a component perpendicular to the wall. This component has a tendency to close the arms of the sonde. If the measuring shoe is located beneath the sonde, the weight of the apparatus may thrust this shoe against the wall with a excessive force; if, on the other hand, the shoe is located above, it will have a tendency to lose contact with the wall, thereby producing appreciable measuring errors. Moreover, in order to carry out several measurements at the same time, one often uses a combination of such shoe-type sondes with other apparatus which must be centered in the well in order to give good results. It is then necessary for the arms not to close under the weight of the apparatus in the case of deviated wells so that the axis of the assembly remains in the center of the borehole.

It is therefore an object of the present invention to provide a new and improved sonde apparatus permitting the use of low-thrust measuring shoes in highly inclined boreholes.

Another object of the invention is to provide a new and improved sonde apparatus with articulated arms that carry centering shoes and at least one measuring shoe and in which the centering force of the apparatus is independent of the thrust force applied to the measuring shoe.

Yet another object of the invention to provide a new and improved sonde apparatus with articulated arms in which the articulations are not subjected to any appreciable degree to any force during the measurement operations.

These and other objects are attained in accordance with the principles of the present invention by a sonde apparatus comprising an elongated body and thrust shoes connected to the body by articulated arms and moved away from the body under the action of springs. At least one measuring shoe is connected to one of the thrust shoes by an articulation mechanism so as to move laterally with respect to a mean position aligned with the contact surface of the said thrust shoe, the said measuring shoe moving away from the mean position under the action of an additional spring fixed on the thrust shoe. The force applied to the measuring shoe by the additional spring is independent of the force that is applied to the centering shoes, and may be small compared thereto. The additional spring can be a multiple-leaf spring construction which bears approximately at the center of the measuring shoe. Moreover, the articulation mechanism is constructed and arranged so that when the thrust shoes are folded back alongside the body, a lever bears against the body to bring the measuring shoe short of the mean position and enable complete retraction alongside the body.

The present invention has other objects and advantages which will become more clearly apparent in connection with the following detailed description of the structure and operation of a preferred embodiment, taken in conjunction with the appended drawings in which:

FIG. 5 and 6 are enlarged views of the measure shoe assembly in the extended and retracted positions, respectively.

Figure 1:
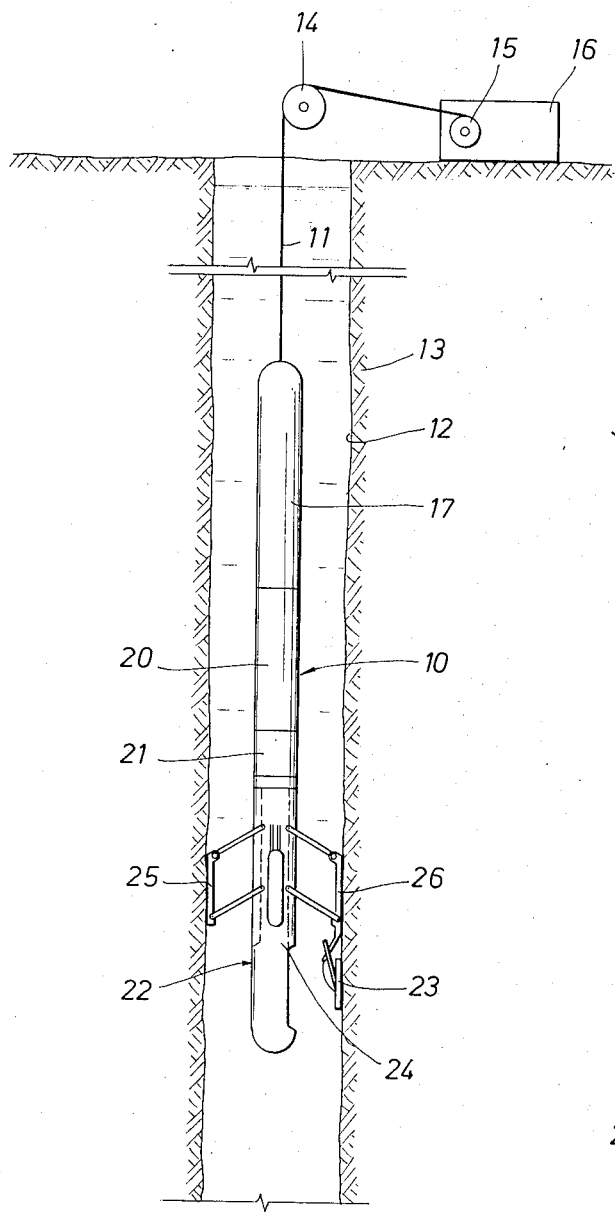
FIG. 1 is a schematic view of an apparatus according to the invention shown in measuring position in a well.

Referring initially to FIG. 1, a measuring apparatus 10 is suspended at the end of a cable 11 in a well bore 12 that penetrates earth formations 13. The cable 11 runs over a sheave 14 and is reeled on a drum 15 of a surface unit 16. The cable has a number of insulated conductors used for sending electrical energy to the apparatus 10 and for transmitting well logging data to the surface. Electronic equipment placed in the unit 16 makes it possible to process and record this data.

The apparatus 10 may be a combination type electrical well-logging sonde designed to measure the resistivity of several zones of formations around the borehole. By way of example, the upper part 17 may be a focused lateral well-logging device, used to measure the resistivity of both deep-lying and medium-lying formations. Such a device is described in particular in French Pat. No. 1,078,314. This upper part may also include other devices such as a radioactivity detector for example, depending on the type of measurement to be carried out. Of course, it is also possible to eliminate this part and connect the cable directly to the lower part of the apparatus.

The lower part, in general consisting of three sections 20, 21 and 22, is used for measuring the resistivity of formations near the borehole. Several techniques are possible, described in particular in the French Pat. Nos. 1,026,245, 1,071,646 and 1,349,862. In all such techniques, an electrode-carrying measuring shoe is used which comes into contact with the wall of the borehole. The section 20 is a sealed tube containing various electronic circuits. Section 21 is a hydraulic section that contains hydraulic equipment to control the opening or closing of the shoes as will be explained in detail below.

Finally, section 22 comprises a body 24 on which are articulated four thrust or centering shoes such as 25 and 26 capable of extending to come into contact with the wall of the wellbore. A measuring shoe 23 is coupled in tandem relationship to the centering shoe 26.

Figure 2:
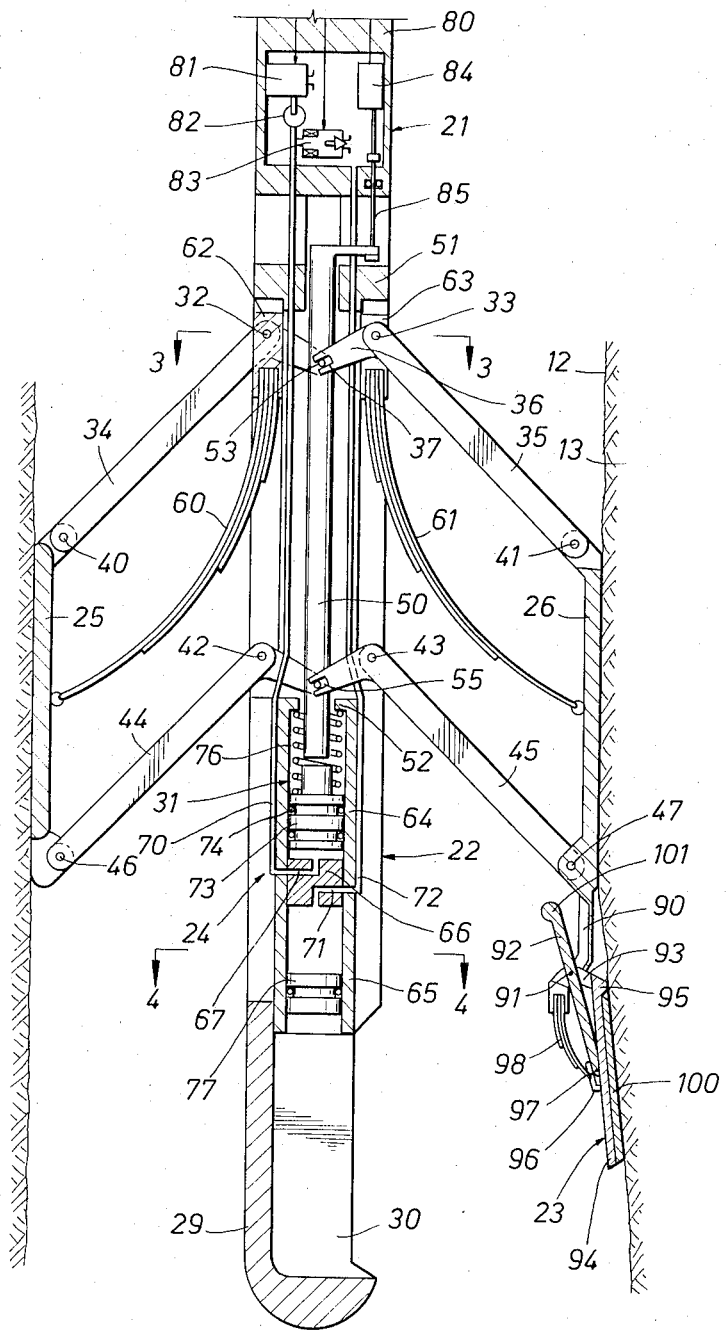
FIG. 2 is a longitudinal sectional view of the lower part of the apparatus of FIG. 1.

FIG. 2 is a sectional view of sections 21 and 22. For the most part, these sections are constructed according to the teachings of the U. S. Application Ser. No. 770,978, already cited, permitting considerable reduction in the length and weight of the apparatus. For the sake of simplicity, only two centering shoes 25 and 26 are shown, however it is generally preferable to use four shoes located within the perpendicular planes passing through the longitudinal axis of the apparatus. The description will however be limited to a two-shoe sonde, the four-shoe arrangement requiring only slight transformations described in the above-mentioned patent application.

Referring now to FIG. 2, the section 22 comprises an elongated body 24 fixed at its upper part to the section 21 and terminating at its lower part in a cradle 29 having a recess 30 designed for receiving the measuring shoe 23. Immediately over the cradle, the body 24 has a motor section 31 that works together with the hydraulic section 21 to control the opening and closing of the shoes 25 and 26.

Figure 3:
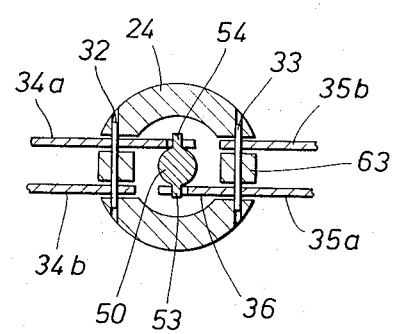
FIG. 3 is a cross-section along line 3—3 of FIG. 2.
Figure 4:
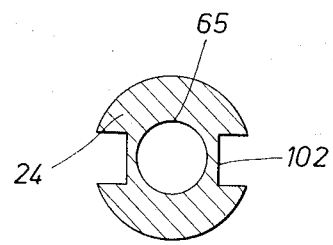
FIG. 4 is a cross-section along line 4—4 of FIG. 2.

At the upper part of the body 24 and in a plane perpendicular to the longitudinal axis thereof are fixed two pivots 32 and 33 parallel to each other and equidistant in relation to the axis. Arms 34 and 35 are hinged respectively on the pivots 32 and 33. As shown in FIG. 3, each arm is formed by two side-members 34a and 34b (or 35a and 35b) spaced apart from each other. The side member 34b (or 35b) is straight while the side member 34a (or 35a) has a bent end 36 which has an open groove 37. The opposite ends of the side members 34a and 34b are articulated on a pin 40 on the centering shoe 25, wherein the opposite ends of the side members 35a and 35b are articulated on a pin 41 on the centering shoe 26.

In a second plane perpendicular to the longitudinal axis and at a certain distance from the pivots 32 and 33, two other pivots 42 and 43 are fixed on the body 24. Two arms 44 and 45 identical to the arms 34-35 are articulated respectively on the pivots 42 and 43 and on pins 46 and 47 mounted at the lower part of the shoes 25 and 26. The pitots 33 and 43 and the pins 41 and 47 thus form the four apexes of a parallelogram which is deformable so that the shoe 26 is always parallel to the longitudinal axis of the sonde. The same is true for the shoe 25.

An axial rod 50 is mounted inside the body 24 and can slide longitudinally through guides 51 and 52. The axial rod has two diametrically opposed trunnions 53 and 54 (FIG. 3) at its upper part and two other trunnions 55 and 56 at its lower part. The recesses 37 of the side members 34a and 35a are engaged respectively on the upper trunnions 53 and 54, and the arms 44 and 45 are engaged in the same manner on the lower trunnions 55 and 56. The longitudinal displacement of the rod 50 is thus a function of the lateral position of the shoes 25 and 26, the position of these shoes always being symmetrical with respect to the longitudinal axis of the body.

The shoes 25 and 26 are driven outward by multiple-leaf springs 60 and 61 having their upper ends fixed to the body 24 by blocks 62 and 63 and their lower ends bearing approximately in the middle of the shoes 25 and 26. When the shoes 25 and 26 are retracted alongside the body 24, the springs 60 and 61 have a practically straight form and are also placed alongside the body, thereby occupying a minimum amount of space while at the same time furnishing substantial thrust.

The motor section 31 includes an actuating cylinder 64 and a storage cylinder 65 placed end-to-end and separated by a sealed partition 66. In this partition 66 a first passage 67 opening into the interior of the actuating cylinder 64 communicates via a conduit 70 with the hydraulic section 21. A second passage 71 opening into the storage cylinder communicates via a conduit 72 with the hydraulic section. A power piston 73 having seal rings 74 slides within the actuating cylinder 64 and is urged downwardly by a coil spring 76. This piston produces the closing of the arms by acting on the axial rod 50 as will be explained further below. A floating piston 77 slides freely in the storage cylinder 65, thereby forming a variable volume reservoir or expansion chamber within which the pressure is the same as that of the borehole fluids in contact on its lower face.

The hydraulic section 21 includes an oiltight, oil-filled envelope 80 containing an electrically driven pump 81 whose output is connected to the conduit 70 via a check valve 82. A solenoid valve 83 is placed between the interior of the envelope and the conduit 70. The conduit 72 opens directly into the envelope 80. This envelope may also contain measuring instruments such as a potentiometer 84, the cursor of which is driven by a connecting rod 85 fixed to the axial rod 50. Such a potentiometer will thus give an electric signal which is a function of the diameter of the borehole. The pump 81, the solenoid valve 83 and the potentiometer 84 are all connected by electric wires to the conductors of the cable 11.

As shown more clearly in FIG. 5, the centering shoe 26 has its lower part formed by a curved extension 90 on which is mounted the measuring shoe assembly 23. The extension 90 has a pin 91 on which are articulated a lever 92 and a connecting link 93. The shoe assembly 23 includes a metallic support 94 whose upper end is connected by a pin 95 to the connecting link 93 and whose middle part has a guide with a longitudinal slot 96, that slidably receives a pin 97 fixed on the lower end of the lever 92. A leaf spring 98 fixed in a recess in the end of the bent extension 90 bears against the lower end of the lever 92 and in the neighborhood of the center of the support 94. This spring is chosen so as to exert a relatively small force in relation to the force exerted by the springs 60 and 61. The shoe assembly 23 also has an electrode holding part 100 of rubber or neoprene which comes into contact against the wall of the borehole. Due to the system of articulations, the support 94 and the part 100 can move inwardly and outwardly with respect to a mean position aligned with the contact surface of the centering shoe 26. We see, in fact that in relation to the centering shoe 26 the measuring shoe 23 may move laterally, i.e., perpendicularly to the longitudinal axis of the body, and can also pivot around the pin 97. Even if the wall of the borehole has irregularities as shown in FIG. 2, the electrode-holder part 100 will also remain in contact with the formations. It will be noted, moreover, that the various articulations are not subjected to any force during the measuring owing to the fact that the spring 98 bears against the center of the shoe 23.

In operation, the apparatus is lowered into the well bore 12 with the centering shoes 25 and 26 folded alongside the body 24. The shoes are folded by starting the pump 81 to send oil under pressure into the cylinder 64 to force the power piston 73 upwardly. The piston 73 drives the axial rod 50 upwardly, and the crank arms 36 cause the arms 34, 35 and 44, 45 to pivot inwardly. When the shoe 26 reaches the neighborhood of the body 24, the upper part 101 of the lever 92 bears against the flat surface 102 of the body (FIG. 6). The lever 92 then pivots around the pin 91, compresses the spring 98 and brings the measuring shoe 23 into the recess 30 of the cradle 29. The electrode-holder part 100, set back with respect to the surface of the centering shoe 26, is thus protected and cannot rub against the wall of the borehole. In order to apply the shoes against the wall, it is merely necessary to open the solenoid valve 83 to allow fluid from below the piston 73 to bleed back into the envelope 80. The spring 76 brings the piston 73 back to the low position thereby freeing the axial rod 50. The springs 60 and 61 open the centering shoes 25 and 26, with the spring 98 applying the measuring shoe against the wall. The springs 60 and 61 which ensure the centering of the apparatus have a substantial thrust, 100 lb. for example. On the other hand, the force of the spring 98 is chosen so that the friction between the measuring shoe and the wall is not liable to damage the relatively fragile electrode-holder part, while at the same time ensuring good contact against the formations. A suitable force is, for example, 40 lbs. It will be noted that if a different measuring shoe is used, it will be very easy to mount a suitable spring without changing other elements of the apparatus.

A new and improved well logging sonde has been disclosed that includes arm mounted centering shoes with measuring shoes coupled thereto. The centering shoes and measuring shoe have independent means to apply outward thrust, so that the measuring shoe can be thrust against the wall of a borehole with a preselected pressure. Since certain changes or modifications may be made in the disclosed embodiment without departing from the inventive concepts involved, it is the aim of the appended claims to cover all such changes or modifications falling within the true spirit and scope of the present invention.

I claim:

1. Apparatus for use in a well bore, comprising: an elongated body member adapted to be moved along the axis of a borehole; extensible and retractible centering means on said body member adapted to engage the wall of the well bore to center said body member therein; shoe means adapted to contact the well bore wall; linkage means for coupling said shoe means in tandem relationship to at least one of said centering means, said linkage means including a plurality of linkage members having pivot connections to said one centering means and to said shoe means to enable said shoe means to move laterally of said body member and inwardly and outwardly with respect to a mean position aligned with said one centering means; and means on said centering means for pressing said shoe means against the well bore wall with a preselected pressure.

2. The apparatus of claim 1 wherein said pressing means is constituted by a spring mounted on a portion of said centering means and arranged to apply outward thrust to said shoe means.

3. The apparatus of claim 2 further including means for compressing said spring in the retracted condition of said centering means to prevent disposition of said shoe means outwardly of said mean position.

4. Apparatus for use in a well bore, comprising:
an elongated body; a plurality of wall-engaging members, each member being movable laterally of said body between a position alongside said body and a position of engagement with a well bore wall, said members functioning to center said body in the well bore; arm means for articulating each of said members on said body; first spring means for thrusting said members outwardly of said body; shoe means including a shoe adapted to contact the well bore wall; linkage means including a plurality of linkage members for coupling said shoe in tandem relationship to one of said members, said linkage members each having pivot connections to said one member and to said shoe to enable said shoe to move laterally outwardly and inwardly with respect to a mean position vertically aligned with said one member; and second spring means for thrusting said shoe outwardly independently of said members.

5. The apparatus of claim 4 wherein said first spring means is mounted externally of said body and said second spring means is mounted on said one member.

6. The apparatus of claim 5 wherein both of said spring means are constituted by curved blades, said second spring means being selected with respect to said first spring means so that said shoe exerts a lesser pressure against the well bore wall than said members.

7. The apparatus of claim 6 further including means for preventing the disposition of said shoe outwardly of said means position when said members are in retracted positions alongside said body.

8. The apparatus of claim 7 wherein said last-mentioned means includes a lever that bears against the body and functions to compress said second spring means.

* * * * *